March 12, 1968 SUKETADA NAGANO 3,372,884

AUTOMATIC TAPE THREADING MACHINE

Filed March 11, 1966 3 Sheets-Sheet 1

Inventor
Suketada Nagano by Hill, Sherman, Meroni, Gross & Simpson Attys.

AUTOMATIC TAPE THREADING MACHINE

Filed March 11, 1966 3 Sheets-Sheet 2

Inventor
Suketada Nagano by Hill, Sherman, Meroni, Gross & Simpson Attys.

Inventor
Suketada Nagano by Hill, Sherman, Meroni, Gross & Simpson Attys.

3,372,884

AUTOMATIC TAPE THREADING MACHINE

Suketada Nagano, Tokyo, Japan, assignor to Sony Corporation, Tokyo, Japan, a corporation of Japan Filed Mar. 11, 1966, Ser. No. 533,685
9 Claims. (Cl. 242—55.12)

This invention relates to an automatic tape threading machine and more particularly to an automatic tape threading machine for a magnetic tape recording and reproducing system.

According to this invention, one end of a magnetic tape wound on a supply reel placed on the reel disc is automatically caught to be drawn out of the reel and brought to a predetermined position, for example, to a take-up reel, so that the tape is caused to pass in front of recording and reproducing heads and a capstan, and then the magnetic tape is wound on the take-up reel.

Accordingly, it is one object of this invention to provide a magnetic tape recorder in which the loading of the tape is simple.

It is another object of this invention to provide a magnetic tape recorder with which automatic continuous playing can be accomplished.

It is a further object of this invention to provide a tape threading machine comprising a reel having wound thereon a tape, first securing means attached to the end of the tape, a spool having second securing means, means for rotating said spool for interlocking the second securing means with the first securing means, and means for drawing out the tape from the reel.

Other objects, features and advantages of this invention will become apparent from the following description taken in conjunction with the accompanying drawings, in which.

Figure 3:
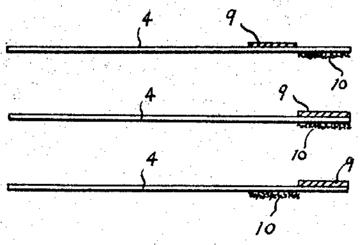
Figure 4:
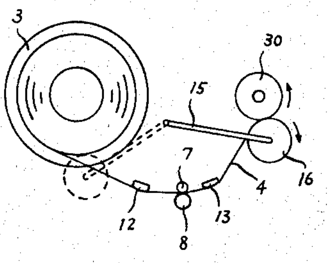
Figure 5:
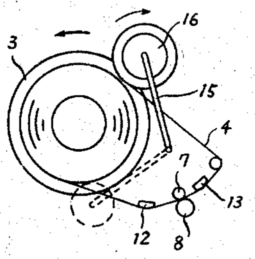
Figure 6:
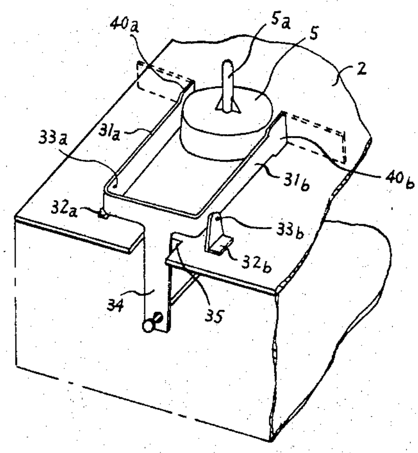
Figure 8:
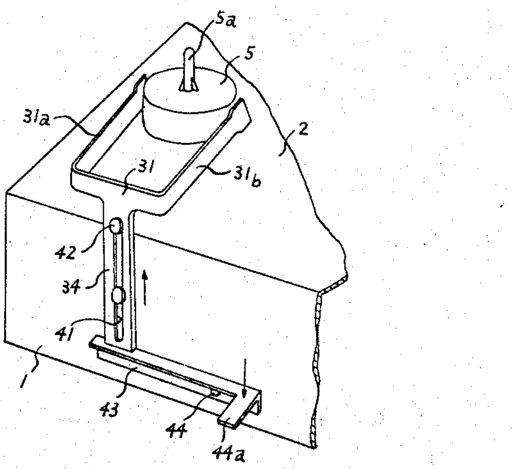
Figure 7:
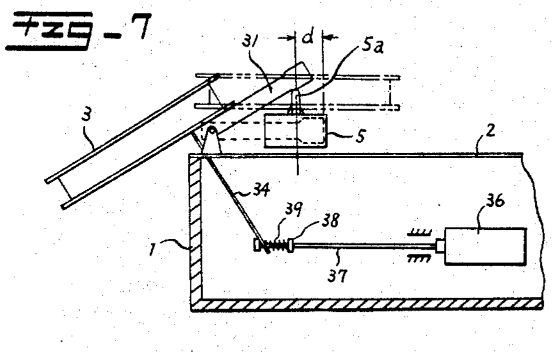
Figure 9:
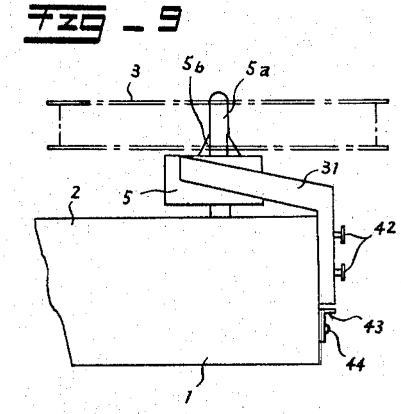
Figure 10:
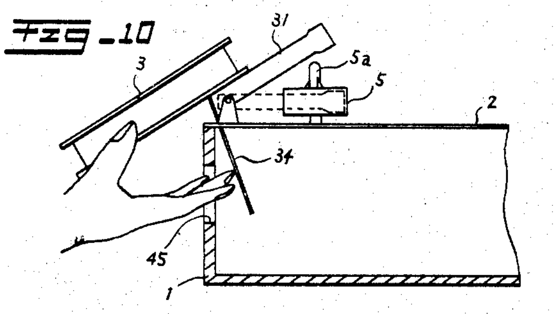
Figure 11:
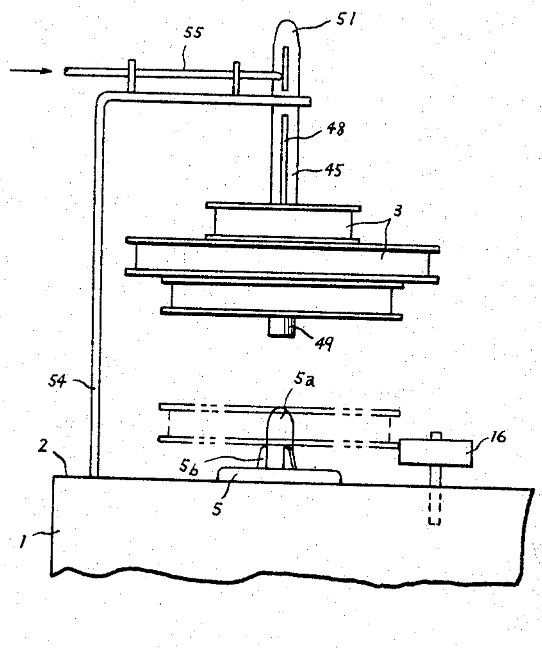
Figure 12:
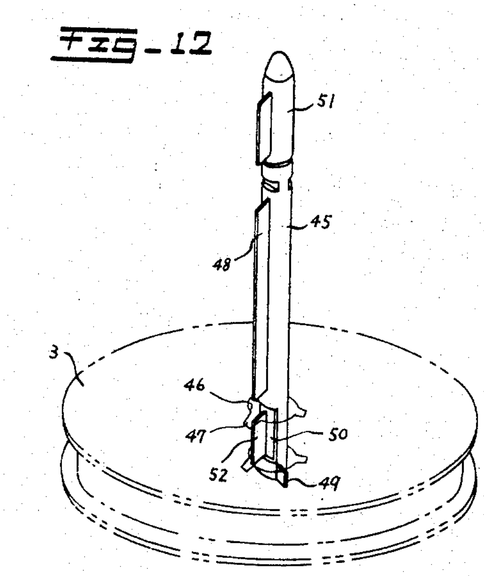
Figure 13:
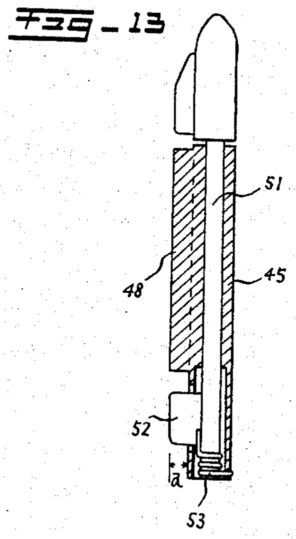

FIGURES 3A to 3C, inclusive, are side views of one end of a magnetic tape applicable to this invention;

FIGURES 4 and 5 are schematic partial plan views of the principal part of the machine for purposes of explanation of this invention;

FIGURE 6 is a perspective view illustrating an example of reel ejection means for use with this invention;

FIGURE 7 is a cross-sectional view of the reel ejection means illustrated in FIGURE 6;

FIGURE 8 is a perspective view, similar to FIGURE 6, illustrating another example of the reel ejection means;

FIGURE 9 is a view in elevation of the means depicted in FIGURE 8;

FIGURE 10 is a perspective view, similar to FIGURES 6 and 7, illustrating another example of the reel ejection means;

FIGURE 11 is a side view of a reel loading device under one operative condition thereof, which is applicable to this invention;

FIGURE 12 is a perspective view of the reel loading device illustrated in FIGURE 11; and FIGURE 13 is a cross-sectional view of the device shown in FIGURES 11 and 12.

Referring to the drawings, the present invention will hereinafter be described in detail as applied to a magnetic tape recorder.

Figure 2:
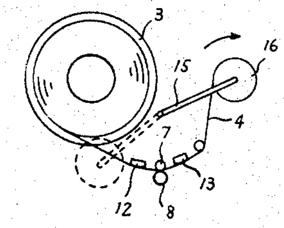
FIGURE 2 is a partial plan view schematically illustrating the principal part of the machine illustrated in FIGURE 1.

Reference numeral 1 identifies the chassis of a magnetic tape recorder, 2 its upper panel, 3 a supply reel, 4 a magnetic tape wound thereon and 5 a reel disc for supporting the supply reel 3. The upper paneil 2 has arranged thereon a rotatable disc 6 symmetrically with the reel disc 5. There is no need of the provision of a reel disc for a take-up reel. On the panel 2, there are disposed a capstan 7 and a pinch roller 8 between the reel disc 5 and the rotatable disc 6, the pinch roller 8 being located further to the front of the recorder than the capstan 7. This position of the pinch roller 8 is referred to as the front direction. During recording and reproducing, the pinch roller 8 is urged into rotating contact with the capstan 7 to drive the magnetic tape 4 gripped therebetween. In this type of magnetic tape recorders, it is preferable that when the recorder is not in actual use the pinch roller assume a position where its top end is lower than the lower marginal edge of the magnetic tape, as disclosed in, for example, United States Patent No. 3,145,894. However, such an arrangement is not directly concerned with this invention and therefore no detailed explanation will be given thereon in this specification. In proximity of one end of the magnetic tape 4, the tape has attached to the inside thereof an adhesive tape 9 having a pressure sensitive layer and a fastener 10 having a plurality of non-metallic securing elements on the outer surface thereof, as illustrated in the various embodiments of FIGURES 3A, 3B or 3C. The non-metallic fastener comprises a number of hook-like gripping elements on one of the interengaging fastener means and a matted or tufted element on the other. When the gripping elements are pressed against the matted or tufted elements, the gripping elements become embedded therein. The adhesive tape 9 holds the end of the tape 4 against the winding immediately inside of it to form a seal when the tape is wound on a reel perfectly by means for pushing the end of the tape, so that the tape 4 snugly wound on the reel does not come loose and the tape 4 is protected from dust when the reel is off the machine. The same result can be obtained by the use of a tape having a wide end portion or a wide leader tape. Reference numeral 11 indicates a capstan motor adapted to be rotated reversibly. Further, a pair of magnetic heads 12 and 13 are located in the path of the magnetic tape 4 which is transported, being gripped between the capstan 7 and the pinch roller 8, as illustrated in FIGURE 2. The one magnetic head 12 is actuated to record or reproduce a magnetic track of one channel of the magnetic tape 4 when the tape is transported in one direction, for example, to the right, while the other magnetic head 13 is similarly actuated to record or reproduce a magnetic track of the other channel when the tape travels in the opposite direction or to the left. Thus, recording and reproducing can be performed in both directions of tape transport.

Figure 1:
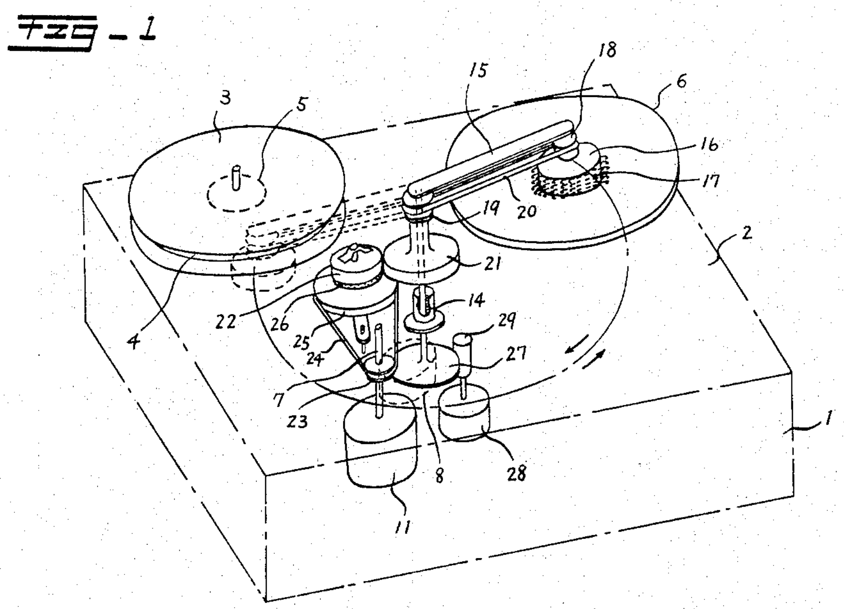
FIGURE 1 is a perspective view schematically illustrating an example of an automatic tape threading machine according to this invention.

As clearly seen from FIGURE 1, there is arranged on the panel 2 and arm 15 which is rotatable about a shaft 14 and has rotatably affixed to the free end thereof a spool 16. The peripheral surface of the spool 16 has attached thereto a fastener 17 which constitutes one of the interengaging fastener means previously described. The thickness of the spool 16 is smaller than the distance between flanges of the reel 3.

A belt 20 is trained about a pulley 18 secured to the spool 16 and a pulley 19 rotatably affixed to the shaft 14. A wheel 22 has driving engagement with a wheel 21 rotatably affixed to the shaft 14 and connected to the aforementioned pulley 19. The wheel 22 is coupled through a slipping clutch 26 to a pulley 25 which is rotated by means of a belt 24 trained thereabout and a pulley 23 fixed to the shaft of the capstan motor 11. The rotational force from the motor 11 is transmitted to the aforementioned spool 16 through the mechanism described just above.

In addition to the motor 11, another motor 28 is provided and a wheel 29 mounted on the shaft thereof has driving contact with a wheel 27 secured to the lower end of the shaft 14, which allows the arm 15 to assume two positions, the one bieng shown in broken lines and the other in full lines. In the broken line position the spool 16 has driving engagement with the magnetic tape 4 between the flanges of the reel 3 and hence rotates the reel 3, so that the fastener 17 attached to the spool 16 is pressed into engagement with the fastener 10 provided on the end of the tape 4 to permit winding of the tape on the spool 16. Following this, the motor 28 rotates, so that the arm 15 and consequently the spool 16 is returned to its initial position indicated by solid lines, passing in front of the magnetic heads 12 and 13 and the capstan 7. In this position the spool 16 exists above the rotatable disc 6. Thus, the magnetic tape 4 is automatically drawn across the magnetic heads 12 and 13 and the capstan 7, and the rotatable disc 6 aids as a supporter to wind the tape 4 snugly on the spool 16, so that the tape 4 does not slide down from the spool 16 during winding. The chain line represents the arc of movement of the spool 16. Although not illustrated, the rotation of the arm 15 is limited by a stopper and the motor 28 is also stopped simultaneously.

Under such conditions the pinch roller 8 presses the tape 4 evenly against the capstan 7 to draw the tape across the magnetic heads at a constant speed and supply it from the reel 3 to the spool 16. The magnetic head 12 performs recording on a first magnetic track of the magnetic tape 4 or reproducing therefrom. Upon completion of recording or reproducing of the magnetic tape 4 in one direction, the direction of rotation of the motor 11 is automatically changed and simultaneously the reel 3 is rotated by, for example, the motor 11, though not illustrated, so that the magnetic tape 4 is transported in a reverse direction and the magnetic head 13 effects recording on a second magnetic track or reproducing therefrom. Thus, the magnetic tape 4 is rewound on the reel 3. In this case, unwinding of the tape can be prevented by the provision of means for pressing the end of the tape toward the center of the winding. These operations can be changed over automatically but mechanisms therefor are not related directly to this invention and hence no explanation will be given in this specification.

In FIGURE 4 there is illustrated another example of this invention which employs a take-up reel or a spool 30 in place of the rotatable disc 6 in the above example and in which the end of the magnetic tape 4 pulled out from the reel 3 by the spool 16 affixed to the arm 15 is taken up on the spool 30. Accordingly in this case the spool 30 is driven by the motor 11 or 28.

FIGURE 5 illustrates still another example of this invention in which the arm 15 and consequently the spool 16 is brought to a side portion of the reel 3, drawing the magnetic tape 4 across the magnetic heads 12 and 13 and the capstan 7, and then the spool 16 is urged into rotating contact with the outer surface of the magnetic tape still wound on the reel 3. In this case the rotation of the reel 3 drives the spool 16, so that the magnetic tape 4 is transported. Accordingly, the belt 20 and the pulleys 18 and 19 such as shown in FIGURE 1 may be dispensed with, and as a result the overall structure can be simplified.

With such an arrangement as described above, the magnetic tape 4 can be threaded around the magnetic heads 12 and 13 and the capstan 7 in an automatic or semi-automatic manner, so that troubles as experienced in the past can entirely be eliminated.

It is highly desirable that the reel 3 having wound thereon the magnetic tape 4 can automatically be replaced with the new one after recording or reproducing of the tape. In FIGURES 6 to 10, inclusive, there are illustrated examples of an automatic reel unloading device, which comprises a lifting member 31 capable of being operated manually or automatically. The lifting member 31 consists of forked arms **31*a* and 31*b* and a projection 34 extending downwards from the central portion of the base of the member at right angles to the plane including the arms. As illustrated in the figures, the lifting member 31 is disposed on the upper panel 2 in such a manner as to hold but not to touch the reel disc 5 between the arms 31*a* and 31*b* of the lifting member 31. Further, the lifting member 31 is hinged about pins 33*a* and 33*b* fixed to lugs 32*a* and 32*b* which are mounted on the panel 2. The projection 34 is inserted into the chassis 1 of the recorder through a hole 35 bored in the panel 2 and the free end of the projection 34 is associated with a rod 37 of a solenoid 36. Reference numerals 38 and 39 identify a stopper and a spring, respectively. The lifting member 31 is usually located in such a position that free ends 40*a* and 40*b* of its arms 31*a* and 31*b* lie on either side of the reel disc 5 but do not touch the reel 3 placed on the disc 5, as illustrated in FIGURE 7 by broken lines. As clearly seen from the figure, the arms 31*a* and 31*b*** extend a distance *d* beyond the shaft **5*a* of the reel disc 5 and such a relation is maintained when the lifting member 31 is rotated about the pins 33*a* and 33*b* as indicated by solid lines. Upon completion of the recording or reproducing of the magnetic tape 4, energization of the solenoid 36 lifts up the reel 3 from the reel disc 5 and guides it on the arms 31*a* and 31*b* of the lifting member 31, thus automatically ejecting the reel 3** from the recorder.

Meanwhile, since the flanges of the reel 3 are provided with apertures of various shapes and the diameter of the reels is different, it is preferred to bend the free ends **40*a* and 40*b* of the arms 31*a* and 31*b* substantially at right angles thereto as illustrated in FIGURE 6 by broken lines in order to ensure accurate lifting of the reel without disadvantage that the free ends 40*a* and 40*b*** will engage any of such apertures.

In FIGURES 8 and 9 there are illustrated another embodiment of the automatic reel unloading device in which the entire lifting member 31 is pushed up to perform the same operation as in the foregoing example. Reference numerals 41 and 42 indicate respectively a guide groove formed in the projection 34 and guide pins. In this example a rod 43 is attached to the side wall of the chassis 1 in such a manner as to be hingeable about a pin 44. The one free end of the rod 43 abuts against the lower end of the projection 34. That is, the lifting member 31 is pushed up by downward movement of the other free end **44*a* of the rod 43 which is energized by the solenoid or the like in the same manner as in the foregoing. In this case the arms 31*a* and 31*b* of the lifting member 31 are formed oblique to the reel 3 placed on the reel disc 5 as clearly seen from FIGURE 9 and the relative arrangement between the free ends 40*a* and 40*b* and the shaft 5*a* of the disc 5** is the same as in the above example.

In the foregoing examples the lifting member 31 is driven by the solenoid 34 but it can be operated manually. FIGURE 10 illustrates an example in which the reel 3 can be taken off from the reel disc 5 by hand. As pictured in the figure, the projection 34 of the lifting member 31 is operated with figures inserted through a hole made in the side wall of the chassis 1. Otherwise, the projection 34 is provided outside of the chassis 1 and operated by hand. Further, it will be apparent that the reel 3 can be removed from the reel disc 5 by pushing down the free end of the rod 43 manually in the example illustrated in FIGURE 8.

In order that a new reel may be automatically loaded on the disc 5 when the used reel has been automatically removed from the disc 5 as described in the foregoing, a reel loading device may be employed in this invention.

In FIGURES 11 to 13, inclusive, there is illustrated an example of such a reel loading device. On the peripheral surface of a sleeve 45 capable of loading thereon a plurality of reels, there are provided a first guide fin 48 extending in the axial direction of the sleeve for guiding a spline 47 formed contiguous to the hole 46 of the reel 3 and a second guide fin 49 similarly extending in the axial direction of the sleeve at a rotary angular position different from the first guide fin 48. Further, a window 50 is made in the sleeve 45 between the first and second guide fins 48 and 49, covering the rotary angular range therebetween. A rotary shaft 50 is loosely inserted into the sleeve 45 and a movable guide fin 52 is provided on the shaft 51 at such a position as to extend through the window 50. The movable guide fin 52 is selected substantially the same in height as the first and second guide fins 48 and 49 as indicated by *a* in FIGURE 13, but the length of the guide fin 52 is substantially the same as the thickness of the reel 3. The rotary shaft 51 is usually biased so that the movable guide fin 52 may lie along the extension of the first guide fin 48. Reference numeral 53 identifies a bias spring for this purpose.

The reel loading device described above is arranged coaxially with and above the shaft 5*a* of the reel disc 5. However, means for this purpose are not directly related to this invention, so no detailed explanation will be given. In short, it is sufficient only to support the sleeve 45 by means of such an L-shaped rod 54 planted on the panel 2 as illustrated in FIGURE 11. Reference numeral 55 indicates a rod for rotating the rotary shaft 51. By pushing the rod 55 in the direction indicated by the arrow, the rotary shaft 51 is rotated to cause the movable guide fin 52 to be in alignment with the second guide fin 49.

Now, the operation of such a reel loading device will be described. When a plurality of reels are loaded on the sleeve 45 from the upper end thereof so that the latter is inserted into the holes of the reels, the spline 47 formed contiguous to the hole 46 of each reel is guided by the first guide fin 48 and only the lowermost reel 3 is guided by the movable guide fin 52 into abutment with the second guide fin 49 as seen from FIGURES 11 and 12, thus preventing falling of the reels from the sleeve 45. By pushing the rod 55 by a solenoid or the like in the direction indicated by the arrow, the rotary shaft 51 is rotated so that the lowermost reel 3 is also rotated correspondingly. When the movable guide fin 52 is aligned with the second guide fin 49, the lowermost reel 3 is guided by the guide fin 49 and falls down from the sleeve 45 on to the reel disc 5. In this case, even if the splines 47 of the fallen reel 3 do not exactly engage with mating members 5*b* formed around the shaft 5*a* of the reel disc 5 as illustrated in FIGURE 11 by broken lines, they can readily be engaged by the rotation of the reel disc 5 or by driving contact of the rotating spool 16 with the reel 3 as has been described with FIGURE 1. When the lowermost reel 3 has fallen as described above, a next reel is supported by the movable guide fin 52 and when the rotary shaft 51 has been returned to its initial position by the spring 53 the reel is guided by the guide fin 52 into engagement with the second guide fin 49 as described just above. A sequence of such operations is performed for each reel and the reels are thus sequentially loaded or the reel disc 5.

In the foregoing the rod 55 is automatically operated by means of the solenoid or the like, but it can be operated by hand. In this specification the fastener having non-metallic securing elements is attached to the end of the tape and the periphery of the spool but some other means may be used in place of such a fastener.

It will be apparent that many modifications and variations may be effected without departing from the scope of the novel concepts of this invention.

What is claimed is:

1. An automatic tape threading machine comprising a flanged reel, a spindle mounting said reel for rotation, a tape wound upon said reel, a spool having means on its periphery for attaching itself to the end of said tape, a magnetic head, and an arm pivotally mounting said spool to draw tape from said reel and bring it into operative engagement with said magnetic head.

2. A machine according to claim 1 including means for separately rotating said arm and said spool.

3. A machine according to claim 1 wherein said spool has a thickness less than the distance between the flanges on said reel, whereby said spool may be received between said flanges.

4. A machine according to claim 1 in which said tape and said spool are provided with interengaging means to draw said tape off said reel.

5. A machine according to claim 4 wherein said spool is arranged to engage the periphery of the tape wound upon said reel in driving engagement to thereby rotate said reel and cause engagement of said interengaging means.

6. A machine according to claim 1 in which said arm is pivotable from a tape engaging position along one portion of said reel to a second tape engaging position along a different portion of said reel wherein said spool is driven by the rotation of said reel.

7. A machine according to claim 4 wherein said interengaging means are non-metallic.

8. A machine according to claim 1 including means for lifting said reel from said spindle.

9. A machine according to claim 1 including means for successively loading said spindle with individual reels.

References Cited

UNITED STATES PATENTS

| | | | |
|---|---|---|---|
| 2,891,736 | 6/1959 | Blaes | 242—55.12 |
| 2,899,200 | 8/1959 | Alles | 226—160 |
| 3,079,055 | 2/1963 | Chevallaz | 226—196 |

FOREIGN PATENTS

| | | |
|---|---|---|
| 750,799 | 1/1967 | Canada. |

LEONARD D. CHRISTIAN, *Primary Examiner.*